US012608092B2

(12) United States Patent
Hashimoto

(10) Patent No.: US 12,608,092 B2
(45) Date of Patent: Apr. 21, 2026

(54) INPUT APPARATUS AND ELECTRONIC APPARATUS

(71) Applicant: CANON KABUSHIKI KAISHA, Tokyo (JP)

(72) Inventor: Yoshitaka Hashimoto, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 136 days.

(21) Appl. No.: 18/359,484

(22) Filed: Jul. 26, 2023

(65) Prior Publication Data

US 2024/0045513 A1     Feb. 8, 2024

(30) Foreign Application Priority Data

Aug. 3, 2022     (JP) ................................. 2022-123744

(51) Int. Cl.
*G06F 3/0338*          (2013.01)
*G06F 3/0362*          (2013.01)
*H04N 23/62*          (2023.01)

(52) U.S. Cl.
CPC .......... *G06F 3/0338* (2013.01); *G06F 3/0362* (2013.01); *H04N 23/62* (2023.01)

(58) Field of Classification Search
CPC ...... H04N 23/62; G03B 17/02; G03B 17/563; G05G 9/047; G05G 1/06; G06F 3/0338
See application file for complete search history.

(56) References Cited

U.S. PATENT DOCUMENTS

| | | | |
|---|---|---|---|
| 5,432,530 A | | 7/1995 | Arita et al. |
| 6,102,803 A | * | 8/2000 | Takeda .................... G06F 3/016 345/161 |
| 6,831,629 B2 | | 12/2004 | Nishino et al. |
| 2005/0190153 A1 | * | 9/2005 | Ushimaru .......... G05G 9/04796 345/161 |
| 2005/0269769 A1 | * | 12/2005 | Naghi .................... A63F 13/24 463/36 |
| 2010/0124634 A1 | | 5/2010 | Slotta |
| 2012/0039579 A1 | * | 2/2012 | Esposito .............. H04N 9/7921 386/E5.069 |
| 2013/0100016 A1 | | 4/2013 | Onodera |
| 2021/0250471 A1 | | 8/2021 | Kikuchi |

(Continued)

FOREIGN PATENT DOCUMENTS

| | | |
|---|---|---|
| EP | 0960685 B1 | 1/2002 |
| JP | S6013622 Y2 | 5/1985 |

(Continued)

OTHER PUBLICATIONS

The above patent documents were cited in a European Search Report issued on Dec. 22, 2023, that issued in the corresponding European Patent Application No. 23180894.0.

(Continued)

*Primary Examiner* — Kelly L Jerabek
(74) *Attorney, Agent, or Firm* — Cowan, Liebowitz & Latman, P.C.

(57) ABSTRACT

An input apparatus includes an operation surface having a twill shape and configured to receive input through tilt operation and press operation, and a wall portion formed at an end of the operation surface. Each vertex of the twill shape is located on a spherical surface. The wall portion protrudes from the spherical surface.

9 Claims, 5 Drawing Sheets

(56) References Cited

U.S. PATENT DOCUMENTS

| | | | | |
|---|---|---|---|---|
| 2022/0305373 A1* | 9/2022 | Ledbetter | | G05G 25/02 |
| 2022/0334608 A1* | 10/2022 | Ninomiya | | G05G 9/047 |
| 2023/0154701 A1* | 5/2023 | Hong | | H01H 19/14 |
| | | | | 200/336 |
| 2024/0143091 A1* | 5/2024 | Akimoto | | G06F 3/04883 |
| 2024/0176382 A1* | 5/2024 | Furuike | | G05G 9/047 |

FOREIGN PATENT DOCUMENTS

| | | | |
|---|---|---|---|
| JP | H0828216 A | 1/1996 |
| JP | 2002-236548 A | 8/2002 |

OTHER PUBLICATIONS

The above patent document was cited in a European Search Report issued on Oct. 31, 2025, that issued in the corresponding European Patent Application No. 23180894.0.

* cited by examiner

INPUT APPARATUS AND ELECTRONIC APPARATUS

BACKGROUND

Technical Field

One of the aspects of the embodiments relates generally to an input apparatus for information input, and more particularly to an input apparatus for input through tilt operation.

Description of Related Art

An electronic apparatus is demanded for a wide variety of operation members. For example, Japanese Patent Laid-Open No. 2002-236548 discloses an input apparatus configured to receive input through multidirectional tilt operations and press operation as an operation member for selecting various setting items in capturing still images, moving (or motion) images, etc.

However, the input apparatus disclosed in Japanese Patent Laid-Open No. 2002-236548 has a smooth operation surface of the input apparatus that the finger of the user touches. Thus, the finger of the user may easily slip on the operation surface, and the user may incorrectly operate the input apparatus.

Some input apparatuses configured to receive input through the multidirectional tilt operations and installed in electronic apparatuses such as conventional cameras have a concave or convex portion on a flat operation surface that the finger of the user touches. However, these shaped input apparatuses have difficulty in the press operation and may hurt the user in the continuous press operation.

SUMMARY

An input apparatus according to one aspect of the disclosure includes an operation surface having a twill shape and configured to receive input through tilt operation and press operation, and a wall portion formed at an end of the operation surface. Each vertex of the twill shape is located on a spherical surface. The wall portion protrudes from the spherical surface. An image pickup apparatus having the above input apparatus also constitutes another aspect of the disclosure.

Further features of the disclosure will become apparent from the following description of embodiments with reference to the attached drawings.

DESCRIPTION OF THE EMBODIMENTS

Figures 1, 2:
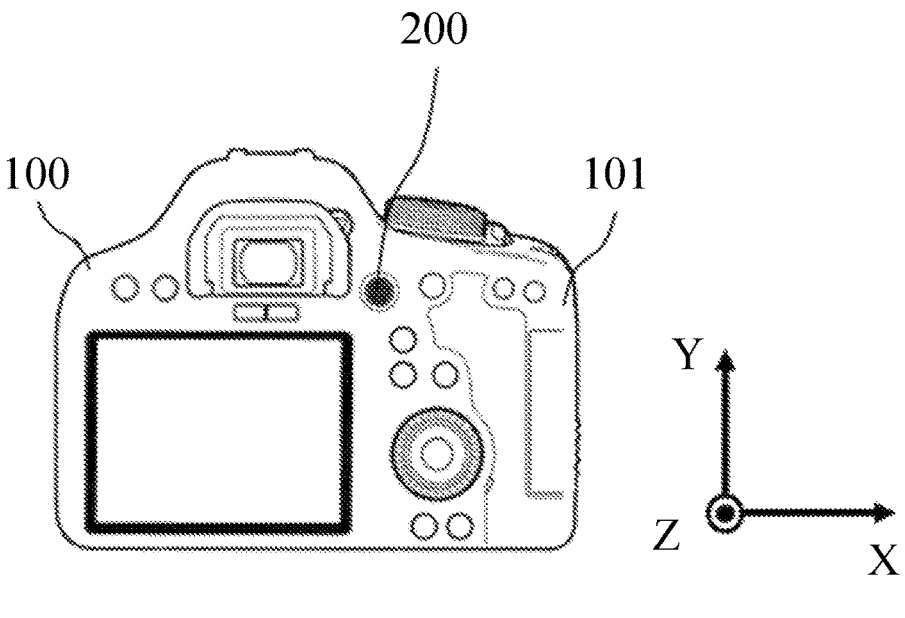
FIG. 1 is a rear view of a camera according to a first embodiment.
FIG. 2 is a sectional view of an input apparatus according to the first embodiment.

Referring now to the accompanying drawings, a detailed description will be given of embodiments according to the disclosure. Corresponding elements in respective figures will be designated by the same reference numerals, and a duplicate description thereof will be omitted.

First Embodiment

Referring now to FIGS. 1 to 5, a description will be given of an electronic apparatus according to a first embodiment. The electronic apparatus according to this embodiment includes, for example, a digital camera. The electronic apparatus will be referred to as camera 100 hereinafter.

FIG. 1 is a rear view of the camera 100 according to this embodiment. The camera 100 has a grip portion 101 to be gripped by the right hand of a user. The camera 100 includes an input apparatus 200 at a position where the user can operate it with his thumb in a case where the user holds camera 100 via the grip portion 101, and the input apparatus 200 is configured to receive input through press operation in a pressing direction and tilt operation in multiple directions. Coordinate axes illustrated in FIG. 1 are provided to define directions in the description, and are also used in other figures. An X-axis is set to a horizontal direction of the camera 100, a Y-axis is set to a vertical direction, and a Z-axis is set to a depth direction.

Figure 3:
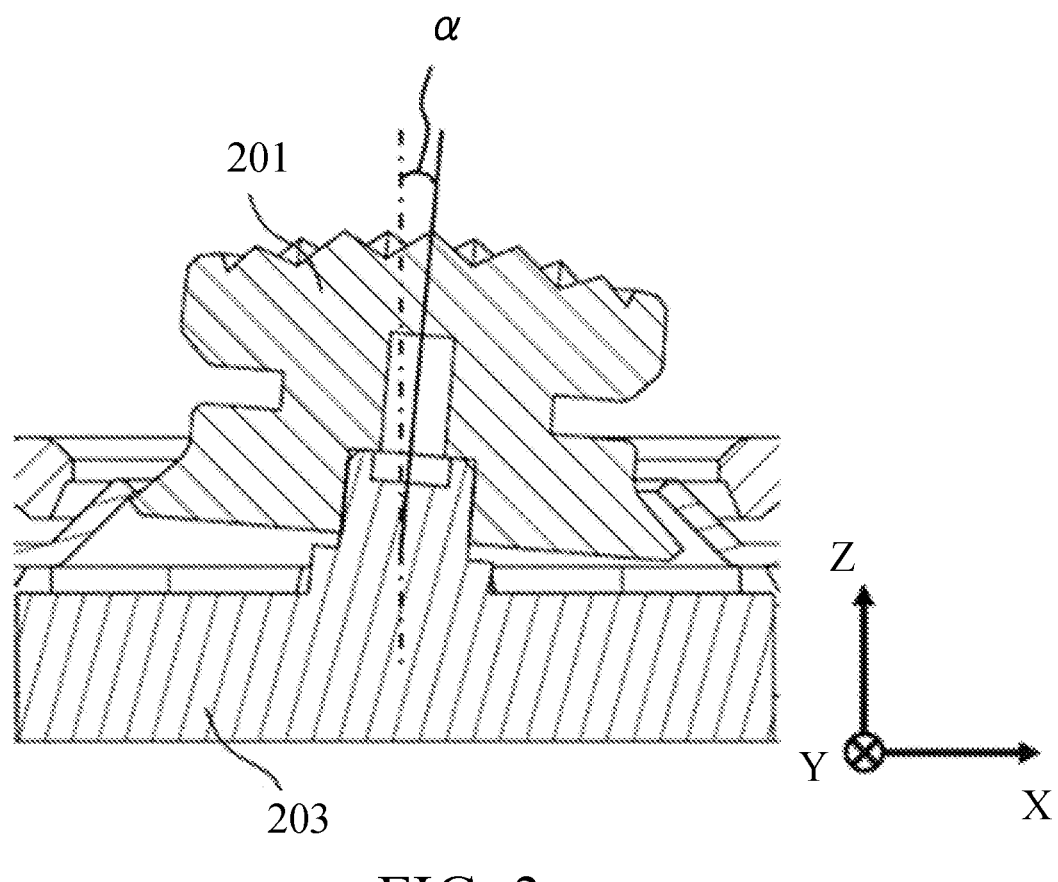
FIG. 3 illustrates the input apparatus during tilt operation according to the first embodiment.

FIG. 2 is a sectional view of the input apparatus 200. FIG. 3 illustrates the input apparatus 200 during tilt operation. The input apparatus 200 includes a keytop 201, a movable switch 203 mounted on a printed wiring board 202, a drip-proof member 204, and a support member 205. The keytop 201 is engaged with the shaft portion 203a of the movable switch 203. The user can tilt or press down the keytop 201 by pressing his finger against a contacted portion 211 of the keytop 201. Thereby, the user can input information to the movable switch 203 by tilting in eight directions and pressing down in the axial direction ($-Z$ direction in each figure). As illustrated in FIG. 3, the tilt operation of the input apparatus 200 is performed by tilting the keytop 201 by an angle a relative to each of the eight directions. This operation inputs operation information in the tilt direction into the movable switch 203. The drip-proof member 204 is engaged with and held in a concave portion 201a provided in part of the keytop 201. In a case where the keytop 201 is moved, the drip-proof member 204 moves together with the concave portion 201a to maintain its engagement with the concave portion 201a. The drip-proof member 204 is sandwiched and fixed between the support member 205 and an exterior cover member 206. Thereby, water and dust can be prevented from entering the camera 100.

Figure 4:
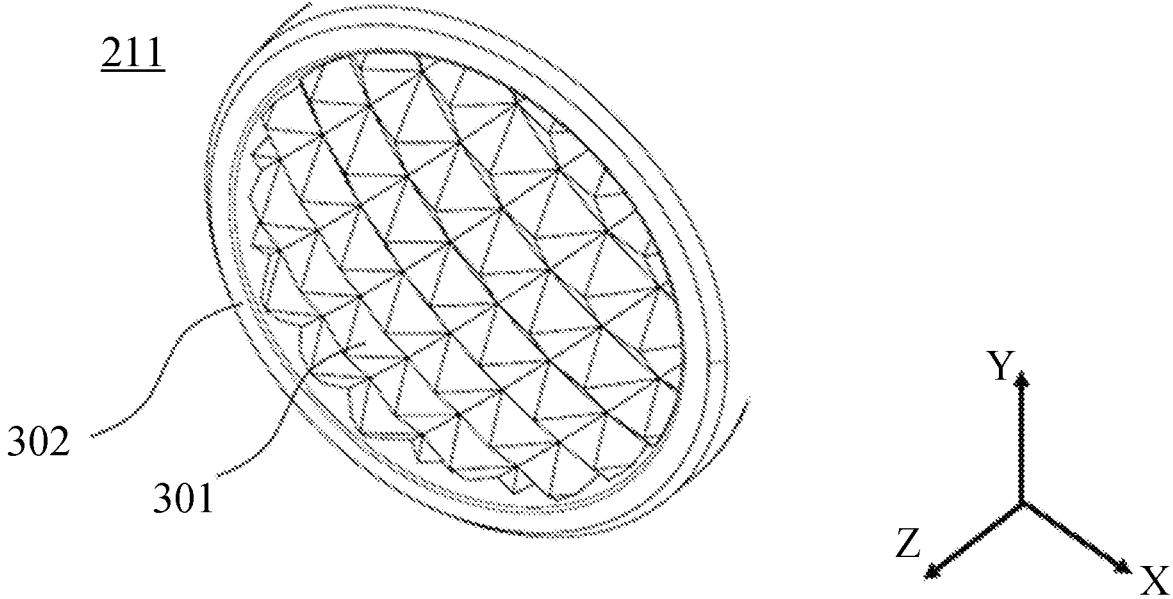
FIG. 4 is a perspective view of a contacted portion of a keytop according to the first embodiment.

FIG. 4 is a perspective view of the contacted portion 211 of the keytop 201. The contacted portion 211 mainly includes a knurled portion (operation surface) 301 having a twill shape, that the finger pad of the user touches, and a wall portion 302 for preventing the finger of the user from slipping during tilt operation.

Figure 5:
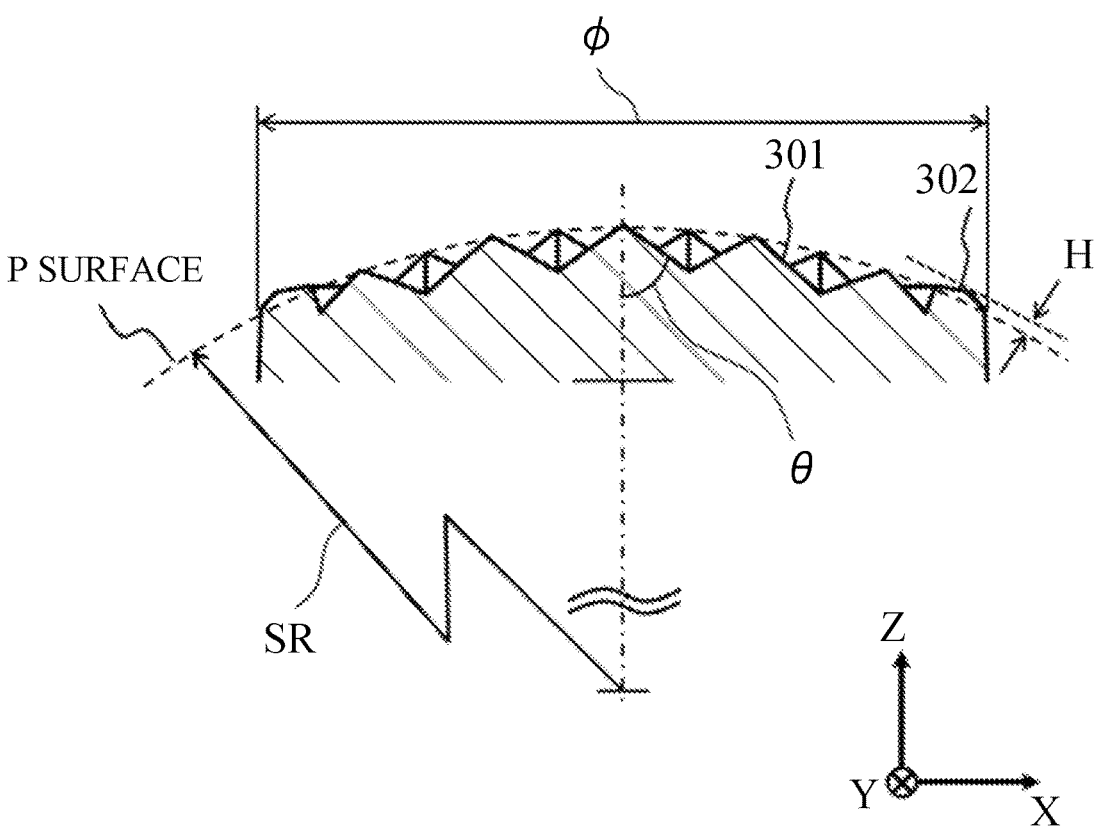
FIG. 5 is an enlarged sectional view of the contacted portion according to the first embodiment.

FIG. 5 is an enlarged sectional view of the contacted portion 211. The contacted portion 211 (the outer shape of the knurled portion 301) has a circular outer shape, and the contacted portion 211 (the knurled portion 301) has a diameter φ. Each vertex of the twill shape of the knurled portion 301 is on a spherical surface (P surface in FIG. 5) having a radius SR. The wall portion 302 formed at the end of the knurled portion 301 protrudes from the P surface by a height H. In this embodiment, the wall portion 302 is provided continuously along the outer circumference of the circular knurled portion 301, but this embodiment is not limited to this example. The wall portion 302 may be provided discontinuously along the outer circumference of the circular knurled portion 301. That is, a plurality of arcuate wall portions may be provided along the outer circumference of the knurled portion 301. Since the knurled portion 301 is a spherical surface, the axis of the press operation direction can be easily recognized, and the operability of the press operation is improved. Since the knurled portion 301 is a spherical surface, the user can easily place his finger on the tilt operation, and the operability of the tilt operation is improved. Since the knurled portion 301 has a twill shape, the frictional force with the finger is improved during tilt operation, and the operability of tilt operation is improved.

The radius SR of the spherical surface and the diameter φ of the contacted portion 211 may satisfy the following inequality (1):

$$0.8\ \varphi{<}SR{<}1.2\ \varphi \tag{1}$$

In a case where the radius SR becomes smaller than 0.8 φ and the user presses down the keytop 201, the pressure applied to the finger becomes biased toward the center of the contacted portion 211, causing pain in the finger if the press operation continues. On the other hand, in a case where the radius SR becomes larger than 1.2 φ and the user presses down the keytop 201, the pressure applied to the finger becomes dispersed around the contacted portion 211, and the certainty of the press operation decreases. Therefore, the contacted portion 211 according to this embodiment may have a shape that satisfies inequality (1).

A convex angle of the twill shape of the knurled portion 301 (angle between the normal to the P surface and the convex slope of the twill shape) is θ. The convex angle θ and the operation angle α during the tilt operation illustrated in FIG. 3 satisfy the following inequality (2).

$$45°{<}\theta{<}90°{-}2\alpha \tag{2}$$

In a case where the angle θ becomes lower than 45° and the finger of the user touches the keytop 201, the pressure received from each vertex of the twill shape increases, causing pain in the finger. In a case where θ is higher than 90°−2α and the finger of the user touches the keytop 201, the finger continuously touches the twill shape and easily slips. Therefore, the contacted portion 211 according to this embodiment may have a shape that satisfies the inequality (2).

The contacted portion 211 of the keytop 201 according to this embodiment may be disposed closest to the user (+Z direction) in an area where the thumb of the user is projected. This is because the accessibility of the thumb decreases as the contacted portion 211 of the keytop 201 is positioned in the −Z direction. However, this condition is not essential.

The above configuration can provide the input apparatus 200 capable of improving the operability of both tilt operation and press operation.

Variation

Figure 6:
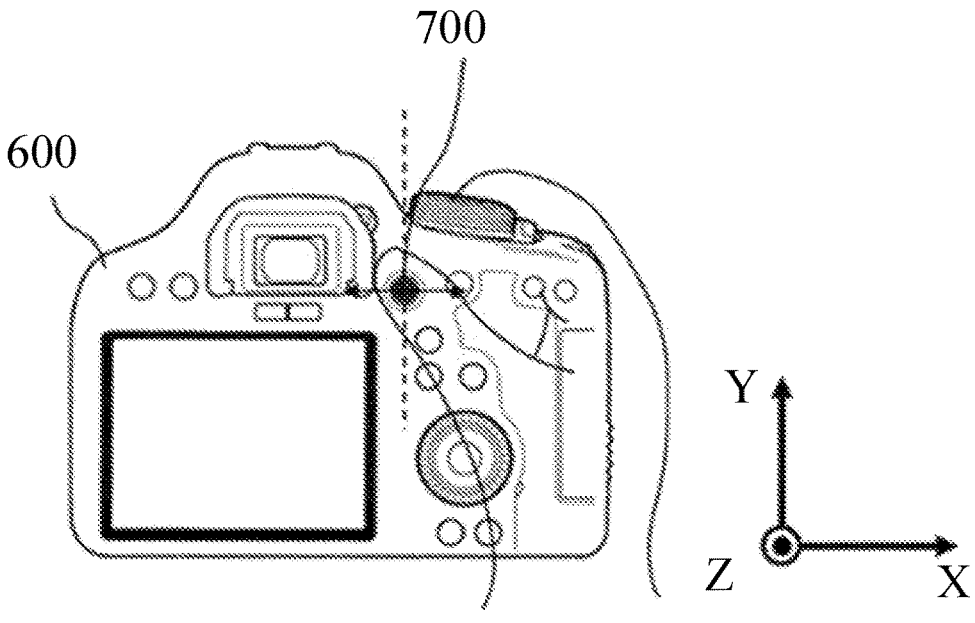
FIG. 6 illustrates how the user holds a camera according to a variation of the first embodiment.
Figure 7:
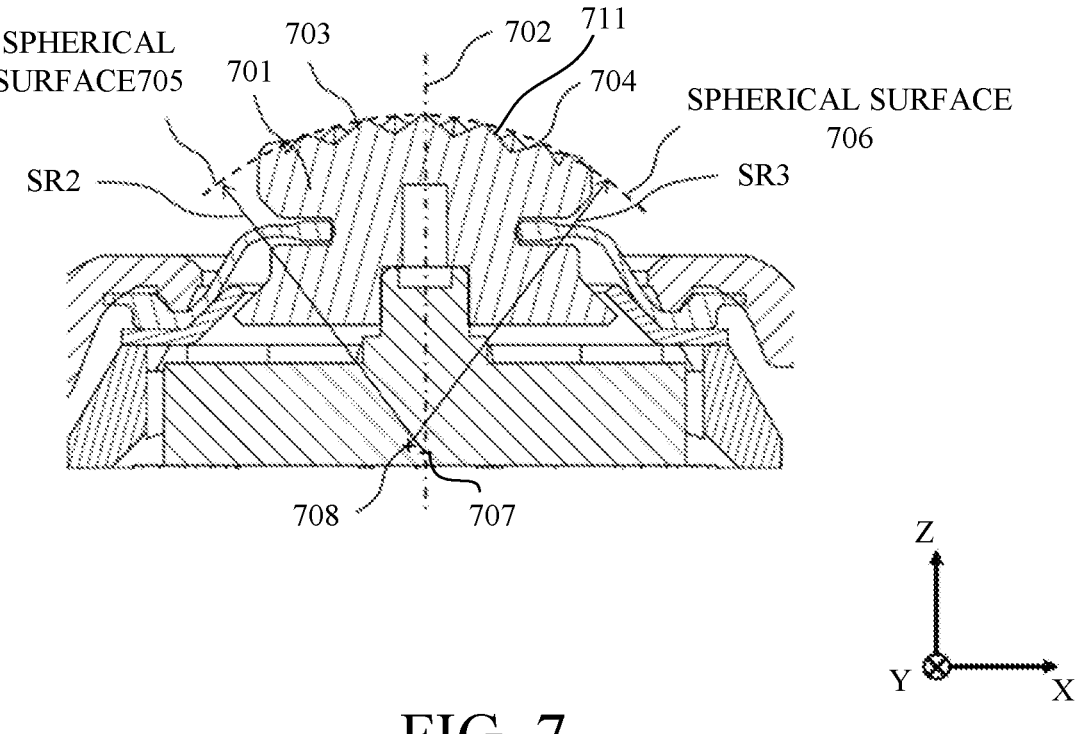
FIG. 7 is a sectional view of an input apparatus according to the variation.

Referring now to FIGS. 6 and 7, a description of an electronic apparatus according to a variation of the first embodiment. Similarly to the first embodiment, the electronic apparatus according to this variation is a digital camera as an example. The electronic apparatus will be referred to as a camera 600 hereinafter. FIG. 6 illustrates the camera 600 held by the user. The camera 600 includes an input apparatus 700 configured to receive input through the press and tilt operations. As illustrated in FIG. 6, the user tilts the input apparatus 700 with his right thumb. In the tilt operation, the ease of operation differs depending on the direction. The operation in the direction of approaching the grip (operation in the +X direction in the figure) is easy to apply force, the operability improves. The operation in the direction away from the grip (operation in the −X direction in FIG. 6) is difficult.

FIG. 7 is a sectional view of the input apparatus 700. The input apparatus 700 includes the same elements as those of the input apparatus 200 except for a keytop 701. A knurled portion of a contacted portion 711 of the keytop 701 includes a knurled portion 703 on the −X side and a knurled portion 704 on the +X side with respect to a central axis 702 as a boundary. In the knurled portion 703, the vertices of the twill shape are located on a spherical surface 705 with a center 707 and a radius SR2. In the knurled portion 704, the vertices of the twill shape are located on a spherical surface 706 with a center 708 and a radius SR3. The center 707 is positioned on the central axis 702 and the center 708 is positioned on the −X side of the central axis 702. Thus, the user can easily perform the tilt operation even in a moving direction away from the grip.

In this variation, the vertices of the twill shape are located on a plurality of spherical surfaces having different centers. More specifically, the size of the radius SR remains unchanged (SR2=SR3), and the center position of the spherical surface is shifted. This variation improves the ease of the tilt operation by the thus configured spherical surfaces, but can acquire similar effects by changing the size of the radius SR depending on the area. That is, the vertices of the twill shape may be located on a plurality of spherical surfaces having different radii.

The configuration according to this variation can provide the input apparatus 700 with improved operability of both the tilt operation and the press operation.

Second Embodiment

Figure 8:
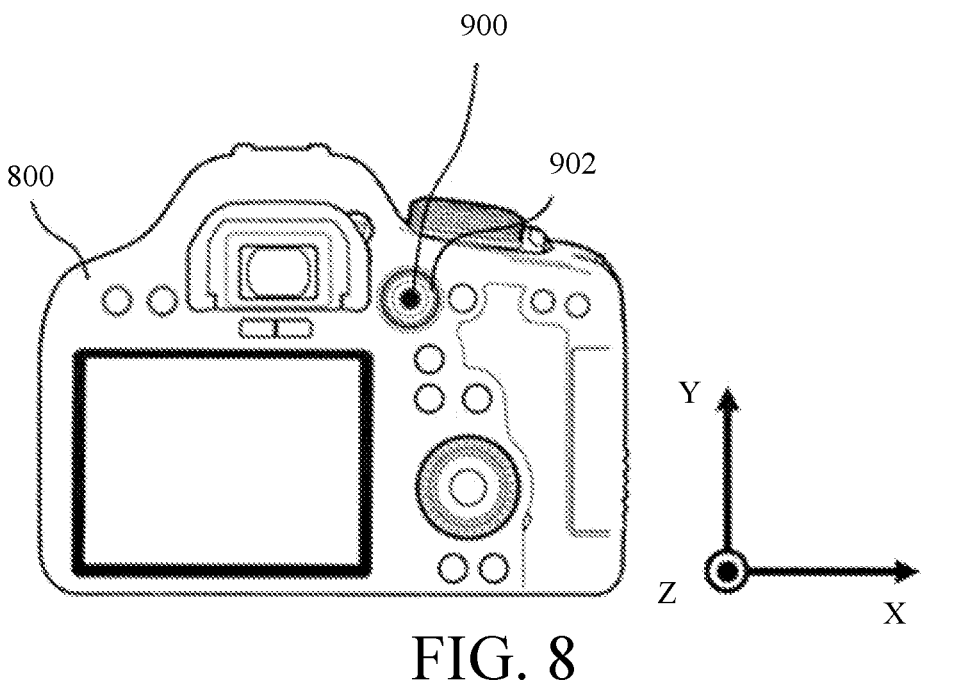
FIG. 8 is a rear view of a camera according to a second embodiment.
Figure 9:
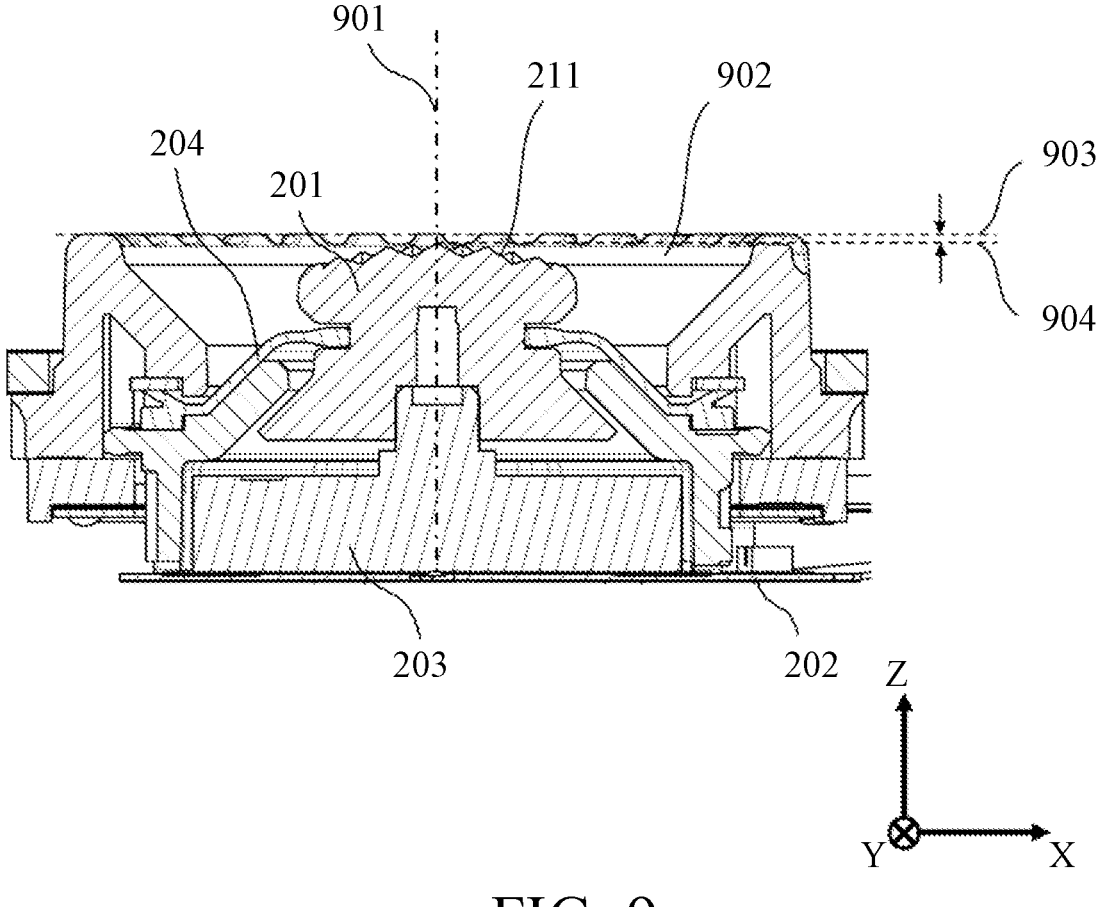
FIG. 9 is a sectional view of the input apparatus according to the second embodiment.

Referring now to FIGS. 8 and 9, a description will be given of an electronic apparatus according to a second embodiment. The electronic apparatus according to this embodiment is, for example, a digital camera. The electronic apparatus will be referred to as a camera 800 hereinafter. FIG. 8 is a rear view of camera 800 according to the second embodiment. The camera 800 includes an input apparatus 900 configured to receive input through press and tilt operations. A dial 902 is disposed around the input apparatus 900.

FIG. 9 is a sectional view of the input apparatus 900. Since the configuration of the input apparatus 900 is similar to that of the input apparatus 200 in the first embodiment, those elements, which are corresponding elements in the first embodiment, will be designated by the same reference numerals. A difference between this embodiment and the first embodiment is a rotationally operable dial (rotating input apparatus) 902 disposed around the input apparatus 900 with a rotation center coaxial with an operation axis 901 for the tilt operation and press operation of the input apparatus 900. That is, the dial 902 is rotatable around the operation axis 901 for the tilt operation and press operation in the input apparatus 900. As illustrated in FIG. 9, the operation surface 903 of the dial 902 is higher than a height 904 of the vertex of the contacted portion 211 of the input apparatus 900. This is because the contacted portion 211 according to this embodiment is less slippery relative to the keytop of the conventional input apparatus and the press operation is easier. The height 904 of the vertex of the contacted portion 211 can be made lower than the conventional height or the operation surface 903 of the dial 902. Therefore, as described above, the height of the operation surface 903 of the dial 902 can be higher than the height 904 of the vertex of the contacted portion 211, and the contacted portion 211 of the input apparatus 900 does not hinder the rotational operation of the dial 902.

The configuration according to this embodiment can provide the input apparatus 900 with improved operability of both the tilt operation and the press operation even in a case where the rotationally operable member is disposed around the input apparatus 900.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-123744, filed on Aug. 3, 2022, which is hereby incorporated by reference herein in its entirety.

What is claimed is:

1. An input apparatus comprising:
an operation surface having a twill shape and configured to receive input through tilt operation and press operation; and
a wall portion formed at an end of the operation surface, wherein the wall portion protrudes from a spherical surface formed by a plurality of vertices of the twill shape in an axis direction of the input apparatus but does not protrude from a vertex of the twill shape located in center of the operation surface in a direction perpendicular to the axis.

2. The input apparatus according to claim 1, wherein the operation surface has a circular outer shape, and
wherein the following inequality is satisfied:

$$0.8\ \varphi < SR < 1.2\ \varphi$$

where SR is a radius of the spherical surface, and $\varphi$ is a diameter of the operation surface.

3. The input apparatus according to claim 1, wherein the following inequality is satisfied:

$$45° < \theta < 90° - 2\alpha$$

where $\theta$ is an angle formed between a normal to the spherical surface and a vertex slope of the twill shape, and $\alpha$ is an operation angle of the tilt operation.

4. The input apparatus according to claim 1, wherein the spherical surface includes a plurality of spherical surfaces with different centers.

5. The input apparatus according to claim 4, wherein the spherical surface includes a plurality of spherical surfaces with different radii.

6. An electronic apparatus comprising:
a grip portion to be gripped by a user; and
an input apparatus disposed so that the user gripping the grip portion can operate the input apparatus with a finger of the user,
wherein the input apparatus includes:
an operation surface having a twill shape and configured to receive input through tilt operation and press operation; and
a wall portion formed at an end of the operation surface, wherein the wall portion protrudes from a spherical surface formed by a plurality of vertices of the twill shape in an axis direction of the input apparatus but does not protrude from a vertex of the twill shape located in center of the operation surface in a direction perpendicular to the axis.

7. The electronic apparatus according to claim 6, further comprising a rotational input apparatus that is rotationally operable and disposed around the input apparatus.

8. The electronic apparatus according to claim 7, wherein the rotational input apparatus is a dial rotatable around an operation axis of the tilt operation and the press operation in the input apparatus.

9. The electronic apparatus according to claim 7, wherein the operation surface of the rotational input apparatus is higher than the vertex of the operation surface in the input apparatus.

* * * * *